Sept. 29, 1931.   W. H. WORTHINGTON   1,824,861
TILTING MECHANISM FOR HARVESTERS
Filed April 11, 1930    3 Sheets-Sheet 1

INVENTOR
Wayne H. Worthington
Arthur C. Brown
ATTORNEY

Sept. 29, 1931. W. H. WORTHINGTON 1,824,861
TILTING MECHANISM FOR HARVESTERS
Filed April 11, 1930 3 Sheets-Sheet 2
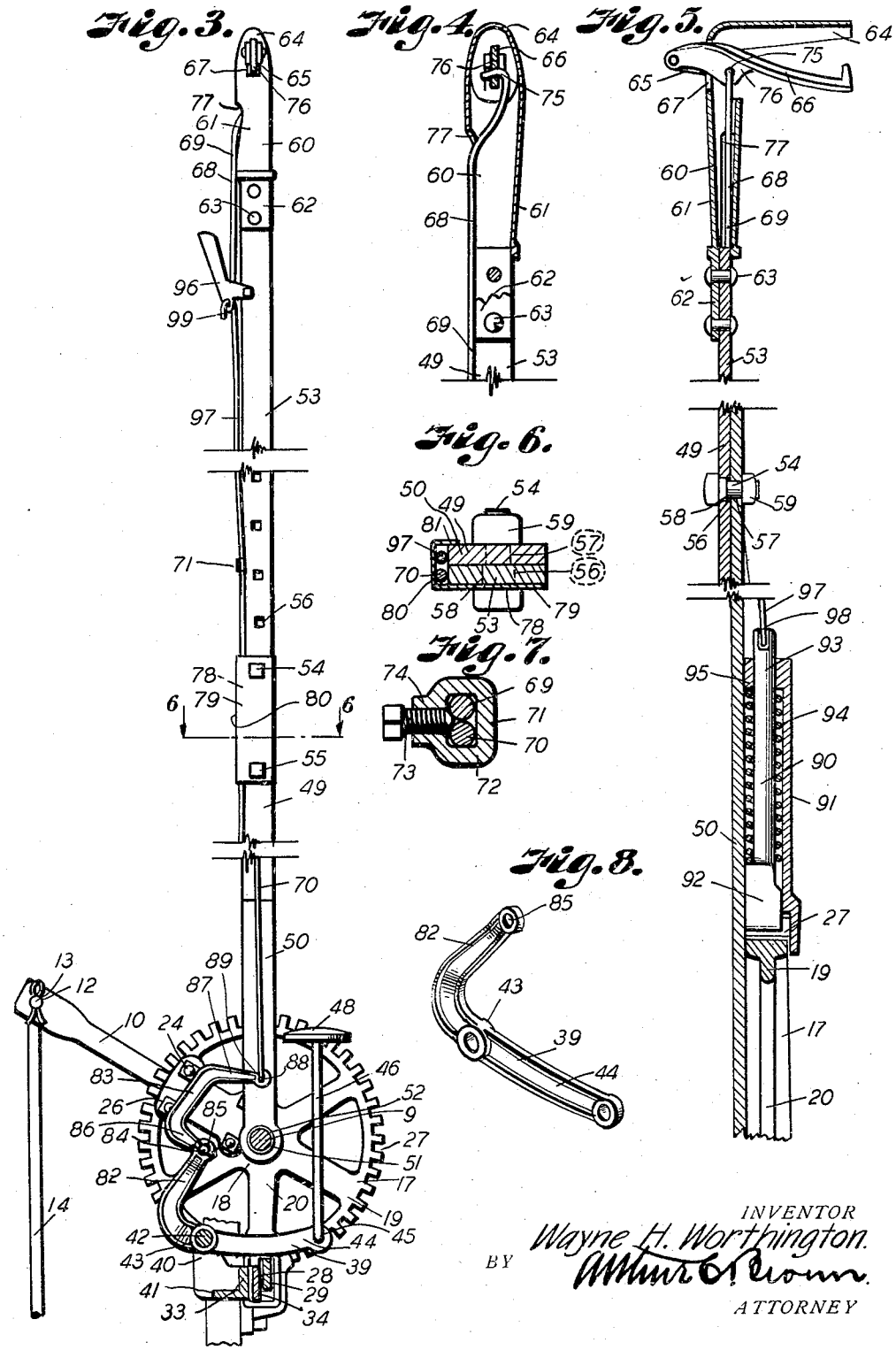
INVENTOR
Wayne H. Worthington.
BY
ATTORNEY Sept. 29, 1931.   W. H. WORTHINGTON   1,824,861
TILTING MECHANISM FOR HARVESTERS
Filed April 11, 1930   3 Sheets-Sheet 3

INVENTOR
Wayne H. Worthington.
BY
ATTORNEY

Patented Sept. 29, 1931

1,824,861

UNITED STATES PATENT OFFICE

WAYNE H. WORTHINGTON, OF BATTLE CREEK, MICHIGAN, ASSIGNOR TO GLEANER COMBINE HARVESTER CORPORATION, OF INDEPENDENCE, MISSOURI, A CORPORATION OF DELAWARE

TILTING MECHANISM FOR HARVESTERS

Application filed April 11, 1930. Serial No. 443,493.

My invention relates to harvesting machines, and more particularly to a tilting mechanism for controlling the cutting unit of a harvester, the principal object of the invention being to provide a tilting mechanism which may be operated either from the operator's platform on the combine or from the draft implement which draws the machine.

In accomplishing this and other objects of the invention, I have provided improved details of structure, the preferred form of which is illustrated in the accompanying drawings, wherein:—

Fig. 3 is a sectional view on the line 3—3, Fig. 2.

Fig. 4 is an enlarged sectional view through the outer end of the tilting lever illustrating the connection of the latch rod with the hand grip trigger.

Fig. 5 is a longitudinal vertical sectional view through the tilting lever illustrating the construction of the pawl for engaging the ratchet wheel.

Fig. 6 is a horizontal sectional view through the tilting lever on the line 6—6, Fig. 3, particularly illustrating the latch rod guide.

Fig. 7 is a sectional view through a latch rod adjusting clamp.

Fig. 8 is a detail perspective view of the latch releasing lever.

Referring more in detail to the drawings:

1 designates the main frame of a combine harvester, and 2 a portion of the cutting unit of the machine which is pivotally supported from the main frame, whereby the cutting unit may be adjusted to the height of grain being cut.

Figures 1, 2:
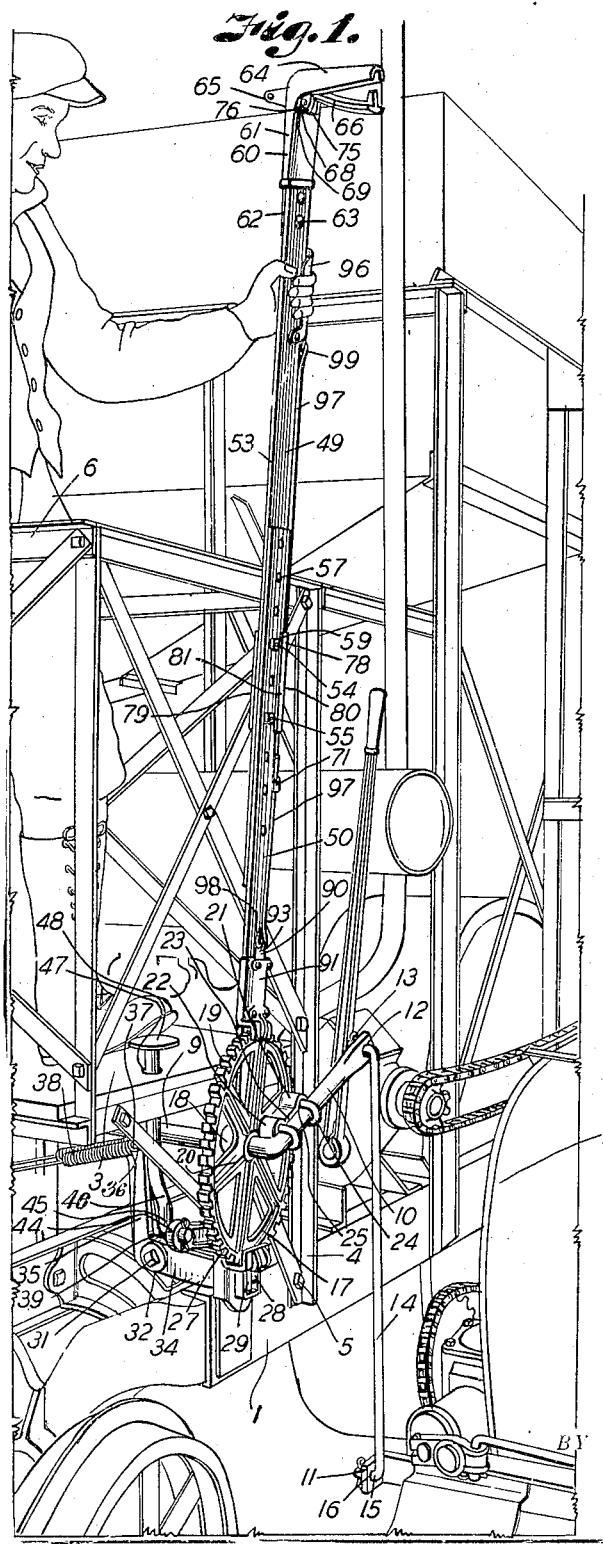
Fig. 1 is a perspective view of a portion of a combine harvester equipped with a tilting mechanism constructed in accordance with my invention.
Fig. 2 is a side elevational view of the tilting mechanism particularly illustrating the latch and latch releasing levers.

Supported on the front end of the main frame of the machine and adjacent the inner end of the cutting unit is a platform 3 from which an operator may control the various operating levers of the machine, including the mechanism for tilting the cutting unit. The platform 3 is spaced from and supported from the main frame 1 by vertical angle irons 4 which are bolted to the main frame as at 5 and to the frame of the platform. Certain of the angle irons extend above the platform to form the corner supports of railing 6 extending about the sides of the platform as illustrated in Fig. 1.

Fixed to an aligning pair of the angle irons 4 below the platform are bearings 7 and 8 for rotatably supporting a horizontal shaft 9 extending crosswise of the main frame and terminating adjacent the end of the cutting unit in a laterally bent lever arm 10, whereby the shaft 9 is connected to an ear 11 carried by the sub-frame supporting the cutting unit. The end of the arm 10 is preferably flattened and provided with an opening 12 for receiving the upper hook-shaped end 13 of a connecting link 14 having a similarly hooked end 15 on its lower end received in an opening 16 formed in the ear 11 so that when the shaft is rotated as later described, the arms 13 through the connecting link 14 tilts the cutting unit on its pivotal support to regulate elevation of the cutting unit with relation to the height of grain being cut.

Figure 10:
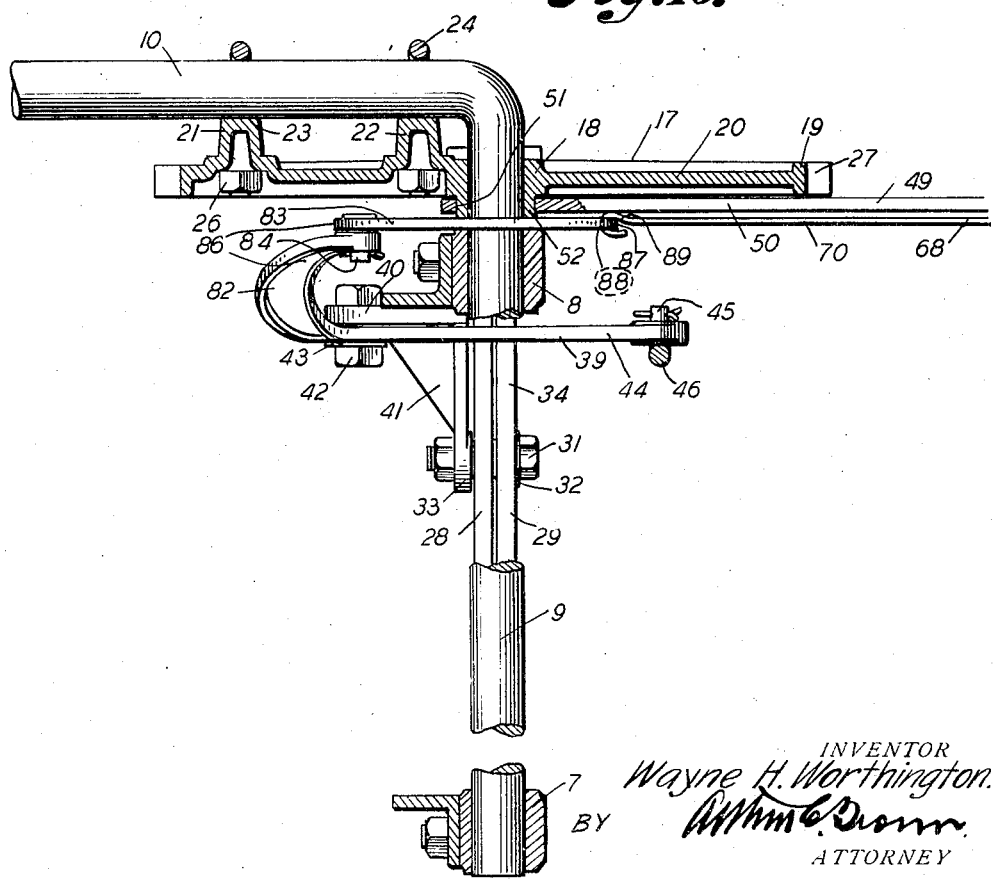
Fig. 10 is an enlarged horizontal sectional view through the ratchet wheel and its supporting shaft, part of the shaft being broken away to better illustrate the relation of the latch levers and the latch releasing mechanism.

Received on the shaft 9 between the bearing 8 and the lever arm 10 is a ratchet wheel 17 including a hub 18, rim 19, and spokes 20 connecting the hub and rim, as shown in Fig. 10.

Formed on one of the spokes 20 is a pair of bosses 21 and 22 having concave seats 23 for receiving the arm 10 of the actuating shaft 9. The arm 10 is retained in the seats 23 by U-bolts 24 straddling the arm and extending through openings 25 formed in the bosses, the U-bolts being secured by nuts 26 threaded thereon and engaging the opposite side of the ratchet wheel. Thus it is apparent that the ratchet wheel 17 is secured to the shaft 9 through the lever arm 10 and that when the wheel 17 is rotated the lever arm will be moved in an arc to change the elevation of the cutting unit.

The rim 19 of the ratchet wheel is provided with a plurality of spaced notches 27 for receiving latching levers 28 and 29 for locking the ratchet wheel in adjusted position. The latch levers 28 and 29 preferably comprise bell cranks pivotally mounted on a bolt 31 extending through hubs 32 formed on the bell cranks and through an ear 33 extending from the bearing member 8 as shown in Fig. 10. The arms 34 of the bell cranks extend substantially horizontally to engage the notches 27, and the arms 35 extend substantially vertically and are provided at their upper ends with openings 36 for receiving the hook ends 37 of coil springs 38 having their opposite ends connected with the framework of the platform, whereby the springs are tensioned to retain the arms 34 of the bell cranks in engagement with the ratchet wheel.

I prefer to employ two independently movable latch levers so that one of the notches of the ratchet wheel will always be in position to be engaged by one or the other of the latch levers to effect closer adjustment of the cutting unit.

In order to release the latch levers, I provide a releasing lever 39 illustrated in detail in Fig. 8. The lever 39 is also of bell crank shape and is pivotally mounted on an ear 40 on the bearing member 8, and braced from the ear 33 by an integral web 41.

The lever is preferably pivoted on the ear by a bolt 42 extending through a hub 43 of the lever and through an opening in the ear as illustrated in Fig. 10. The arm 44 of the lever extends forwardly of the machine to rest on the upper edges of the latch levers 28 and 29. Connected with the end of the arm is a laterally bent end 45 of a rod 46 extending upwardly through an opening 47 in the floor of the platform, and which carries on its upper end a foot pedal 48 so that when it is desired to release the latching levers from engagement with the ratchet wheel, the operator may press his foot on the pedal to move the rod 46 downwardly, causing the arm 44 of the bell crank to cam the release levers downwardly out of engagement with the ratchet wheel.

In order to rotate the ratchet wheel I provide a tilting or ratchet lever 49 preferably comprising a lower bar 50 having an opening 51 at its lower end to receive a reduced extension 52 on the hub of the ratchet wheel as shown in Fig. 10. Adjustably fixed to the upper end of the bar 50 is an extension bar 53 secured by bolts 54 and 55 extending through openings 56 and 57 in the respective bars as shown in Fig. 5. The bolts 54 are preferably provided with a squared shouldered portion 58 to be received in the openings 56 which are formed complementary to the shoulder on the bolts so that when the nuts 59 are tightened on the bolts the squared shouldered portion will prevent the bolts from turning in the bars and the nuts 59 may be readily tightened to clamp the bars together.

The extension bar 53 is provided on its upper end with an L-shaped handle 60 having a tubular portion 61 provided with a downwardly extending tongue 62 which is secured to the free end of the bar by rivets 63. Extending laterally from the tubular portion 61 is a grip portion 64 and aligning therewith is an ear 65 for pivoting a grip trigger 66 which extends through a slot 67 in the handle portion to cooperate with the grip 64 for actuating a pawl release rod 68 now described. The release rod 68 comprises overlapping sections 69 and 70 secured together by clamps 71 comprising loops 72 sleeved over the overlapping portions of the rods and anchored thereto by set screws 73 threaded in tubular bosses 74 on the clamps and engaging the rods as shown in Fig. 7.

The upper end of the rod 69 is preferably provided with a hook 75 for engaging in an opening formed in an ear 76 on the trigger lever 66. The rod 69 extends through a slot 77 formed in the side of the tubular portion 61 of the handle and downwardly along the side of the lever through a guide plate 78 which is retained in position by the bolts 54 and 55 which secure the bars forming the tilting lever.

The guard 78 preferably comprises a plate 79 lying flat against the side of the lever and provided with an L-shaped flange 80 extending over the release rods and having a lateral bent flange 81 overlapping the opposite side of the tilting lever as shown in Fig. 6. The lower end of the rod is connected with a vertical arm 82 of the release lever 39 through a substantially U-shaped connecting link 83.

The link 83 is connected to the arm of the release lever by a pin 84 extending through an opening 85 in the release lever and through a similar opening formed in an arm 86 of the connecting link. The other arm 87 of the connecting link is provided with an opening 88 for receiving a hook 89 formed on the end of the release rod as shown in Fig. 10. Thus it is apparent that when the operator grasps the handle 64 and the trigger grip 67 to shift the tilting lever, the rod 68 through the connecting link rocks the bell crank release lever to cause the arm 43 to cam the latch arms 28 and 29 downwardly out of engagement with the teeth of the ratchet wheel as when the arm is rocked by the foot pedal 48 on the platform 3.

In order to operably connect the tilting lever with the ratchet wheel, I provide a pawl 90 (Fig. 5) slidably mounted in a tubular bracket 91 secured to the face of the lever adjacent the periphery of the ratchet wheel. The pawl 90 includes a head 92 for engaging in the notches and a shank 93 received in the bracket 91. The pawl is yieldingly retained in engagement with the ratchet wheel by a spring 94 sleeved over the shank and having one end bearing against the head 92 and the other against a shoulder 95 formed in the upper end of the bracket.

Pivoted to the upper end of the tilting lever, at a point below the handle grip previously described, is a handle 96 for releasing the pawl which is connected therewith by a release rod 97 extending longitudinally of the lever substantially parallel with the rod 68.

The rod 97 also comprises sections similar to the rod 68 and the ends of the sections are connected to the shank of the pawl and to the releasing handle 96 by hooks 98 and 99 respectively.

Thus it is apparent that when the pawl is engaged with the ratchet wheel and latching levers are released, arcuate movement of the lever will rotate the ratchet wheel to change elevation of the cutting unit as now described.

When the tilting mechanism is to be operated from the operator's platform of the combine the operator places his foot on the pedal 48 and presses it downwardly to cause the arm 43 of the release lever to cam the latch arms out of engagement with the ratchet wheel. He will then rock the tilting lever forwardly to rotate the ratchet wheel and lift the cutting unit through the connecting link 14 and arm 10. He will then release pressure on the foot pedal 48 to allow the latch levers to engage one of the notches to lock the ratchet wheel. He will then grasp the releasing handle to move the pawl 90 out of engagement with the ratchet wheel against tension of the spring 94. He can then return the lever to its former position free of the ratchet wheel to obtain another hold thereon when he again releases the handle 87 thereby allowing the pawl 90 to again engage the wheel. He can then rock the tilting lever forwardly of the machine to continue raising the cutting unit until it has assumed the proper elevation for the height of grain being cut. Thus the operator can continue ratcheting the lever back and forth to regulate the height of the cutting unit to varying height of the grain.

Figure 9:
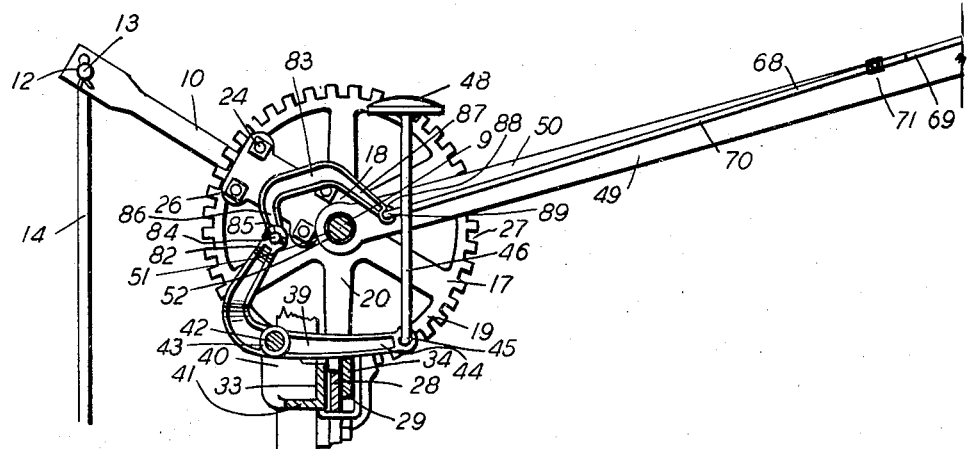
Fig. 9 is a sectional view similar to Fig. 3 illustrating the tilting lever in position to be operated by the operator of the draft implement.

When the tilting lever is to be operated from the draft implement the operator will grasp the releasing handle to release the pawl 90 from engagement with the ratchet wheel so that he can move the tilting lever in substantially horizontal position forwardly of the machine, as shown in Fig. 9, and the sections of the lever including the release rods will be extended to bring the handle grip in reach of the operator on the draft implement. The operator can then release the latching levers 28 or 29 by grasping the grip trigger 66 thereby shifting the rod 68, and the U-shaped lever 83 to actuate the bell crank 39 to cam the release levers downwardly out of engagement with the ratchet wheel. He can then ratchet the tilting lever up and down in the same manner as it was operated when in a vertical position.

What I claim and desire to secure by Letters Patent is:

1. A device of the character described including a ratchet wheel, an actuator for the ratchet wheel, means for latching the ratchet wheel, and means operable from the actuator for releasing the ratchet wheel.

2. A device of the character described including a ratchet wheel, a lever for actuating the ratchet wheel, a latching lever for the ratchet wheel, and means operable from the actuating lever for shifting the latching lever.

3. A device of the character described including a ratchet wheel, a lever for actuating the ratchet wheel, a latching lever for the ratchet wheel, foot actuated means for shifting the latching lever, and a second means operable from the actuating lever for shifting the latching lever.

4. A device of the character described including a ratchet wheel, a lever for operating the ratchet wheel, a pivoted lever for latching the ratchet wheel, a shifting lever engaging the latching lever, a foot pedal for actuating the shifting lever, and means operable from the actuating lever for shifting the latching lever.

5. A device of the character described including a ratchet wheel, a lifting crank operably connected with the ratchet wheel, a lever for actuating the ratchet wheel, a lever for latching the ratchet wheel, and means operable from the actuating lever for shifting the latching lever.

6. A device of the character described including a ratchet wheel, a crank operably connected with the ratchet wheel, a lever for actuating the ratchet wheel, a lever for latching the ratchet wheel, foot actuated means for shifting the latching lever, and a second means operable from the actuating lever for shifting the latching lever.

7. A device of the character described including a ratchet wheel, a lever for actuating the ratchet wheel, a lever for latching the ratchet wheel, a shifting lever engaging the latching lever, a rod slidably mounted on the actuating lever, a link connecting the rod with the latch shifting lever, and a handle member pivoted on the actuating lever for actuating the rod.

8. A device of the character described including a ratchet wheel, a ratchet lever for actuating the ratchet wheel, a spring-pressed lever for latching the ratchet wheel, foot actuated means for shifting the latching lever against tension of its spring, and a second means operable from the actuating lever for shifting the latching lever.

9. A device of the character described including a shaft having a lifting crank, a ratchet wheel on the shaft operably connected with the lifting crank, a tilting lever pivoted concentric of the shaft and having movement independent of the ratchet wheel, a pawl on the actuating lever for engaging the ratchet wheel to cause rotation of the ratchet wheel upon movement of the actuating lever, means on the actuating lever for drawing the pawl, and means operable from the actuating lever for latching the ratchet wheel when the pawl is drawn.

10. A device of the character described including a ratchet wheel, a lever for actuating the ratchet wheel, a pair of latching levers for the ratchet wheel, a latch drawing lever engaging the latching levers, a rod slidably mounted on the actuating lever, a link connecting the rod with the latch drawing lever, and a handle member pivoted on the actuating lever for actuating the rod.

11. A device of the character described including a ratchet wheel, a lever for actuating the ratchet wheel, spring-pressed latching levers for the ratchet wheel, foot actuated means for shifting the latching levers against tension of their springs, and a second means operable from the actuating lever for shifting the latching levers.

12. A device of the character described including a shaft having a lifting crank, a ratchet wheel on the shaft operably connected therewith, an actuating lever pivoted concentric of the shaft and having movement independent of the ratchet wheel, a pawl on the actuating lever for engaging the ratchet wheel to cause rotation of the ratchet wheel upon movement of the actuating lever, means on the actuating lever for drawing the pawl, and means operable from the actuating lever for latching the ratchet wheel when the pawl is drawn.

13. A device of the character described comprising a shaft having a lifting crank, a ratchet wheel operably connected with the lifting crank, an actuating lever pivotally mounted in axial alignment with the shaft, a pawl on the actuating lever for engaging the ratchet wheel, means on the actuating lever for drawing the pawl, a lever for latching the ratchet wheel when the pawl is drawn, a shifting lever engaging the latching lever, and means operable from the actuating lever for actuating the latch shifting lever.

14. A device of the character described including a shaft having a crank arm, a ratchet wheel on the shaft operably connected with the arm, an actuating lever mounted in pivotal relation with the ratchet wheel, a pawl on the actuating lever for engaging the ratchet wheel, means on the actuating lever for drawing the pawl, a pivotally mounted latching lever for engaging the ratchet wheel, a spring for retaining the latching lever in latching position, a bell crank lever having an arm engaging the latching lever, a rod slidably mounted on the actuating lever, a substantially U-shaped connecting link connecting the other arm of the bell crank lever with the rod, and means on the actuating lever for actuating the rod to cause the bell crank lever to move the latching lever against tension of the spring.

15. In a harvester including a main frame and a sub-frame adjustably supported on the main frame, an operator's platform on the main frame, means associated with the operator's platform for adjusting the sub-frame with relation to the main frame, and means for actuating the adjusting means remotely of the operator's platform.

16. In a harvester including a main frame and a sub-frame adjustably mounted on the main frame, and an operator's platform on the main frame, a ratchet wheel on the main frame, means operably connecting the ratchet wheel with the sub-frame, an actuator for the ratchet wheel, means operable from said platform for latching the ratchet wheel to retain the sub-frame in adjusted position, and means on the actuator for shifting the latching lever remotely of the platform.

17. In a harvester including a main frame and a sub-frame pivotally mounted on the main frame, a shaft rotatably mounted on the main frame, a crank arm on the shaft, means connecting the crank arm with the sub-frame, a ratchet wheel fixed on the shaft, an actuating lever rotatably supported by the shaft, a pawl on the actuating lever for engaging the ratchet wheel, means on the actuating lever for drawing the pawl, a latching lever for engaging the ratchet wheel when the pawl is released, and means operable from the actuating lever for shifting the latching lever.

18. In a harvester including a main frame and a sub-frame pivotally mounted on the main frame, a shaft rotatably mounted on the main frame, a crank arm on the shaft, means connecting the crank arm with the sub-frame, a ratchet wheel fixed on the shaft, an actuating lever rotatably supported by the shaft, a pawl on the actuating lever for engaging the ratchet wheel, means on the actuating lever for drawing the pawl, a latching lever for engaging the ratchet wheel when the pawl is drawn, means operable from the actuating lever for shifting the latching lever, and a second means for operating the latch releasing lever comprising a foot pedal slidably supported from the main frame.

19. In a harvester including a main frame and a sub-frame pivotally mounted on the main frame, a shaft rotatably mounted on the main frame, a crank arm on the shaft, means connecting the crank arm with the sub-frame, a ratchet wheel fixed on the shaft, an actuating lever rotatably supported by the shaft, a pawl on the actuating lever for engaging the ratchet wheel, means on the actuating lever for drawing the pawl, latching levers for engaging the ratchet wheel when the pawl is drawn, means operable from the actuating lever for shifting the latching levers, and a second means for operating said shifting means comprising a foot pedal slidably supported by the main frame.

20. In a machine of the character described including a main frame, and a sub-frame adjustably mounted on the main frame, a ratchet wheel rotatably mounted on the main frame, means operably connecting the ratchet wheel with the sub-frame, an extensible actuating lever associated with the ratchet wheel for operating the ratchet wheel remotely of the machine, a pawl on the actuating lever for engaging the ratchet wheel, means extensible with the actuating lever for drawing the pawl, a latching lever for engaging the ratchet wheel when the pawl is drawn, and extensible means operable from the actuating lever for shifting the latching lever.

In testimony whereof I affix my signature.

WAYNE H. WORTHINGTON.